United States Patent [19]

Kildune

[11] Patent Number: 5,266,257
[45] Date of Patent: Nov. 30, 1993

[54] METHOD OF MAKING EMBOSSING ROLLS HAVING INDICIA

[75] Inventor: Joseph S. Kildune, Salem, N.H.

[73] Assignee: GenCorp Inc., Fairlawn, Ohio

[21] Appl. No.: 890,998

[22] Filed: May 29, 1992

[51] Int. Cl.⁵ .................................. B29C 33/40
[52] U.S. Cl. .......................... 264/224; 29/895.32;
264/225; 264/227; 264/284; 264/293; 264/313
[58] Field of Search .............. 264/224, 225, 227, 284, 264/313, 293; 29/895.3, 895.32, 895.33

[56] References Cited

U.S. PATENT DOCUMENTS

| 678,065 | 7/1901 | Thompson et al. | 264/224 |
| 3,018,540 | 1/1962 | Chavnnes | 29/895.3 |
| 3,081,495 | 3/1963 | Kovatch | 264/224 |
| 3,226,800 | 1/1966 | Fenlason | 29/895.3 |
| 3,550,258 | 12/1970 | Odiorne | 29/895.32 |
| 3,619,446 | 11/1971 | Nauta | 264/284 |
| 3,839,514 | 10/1974 | Nauta | 29/895.32 |
| 4,250,135 | 2/1981 | Orsini | 264/227 |
| 4,293,990 | 10/1981 | Pollock | 29/895.3 |
| 4,478,769 | 10/1984 | Pricone et al. | 264/227 |
| 4,551,297 | 11/1985 | Bötcher et al. | 264/224 |
| 4,615,090 | 10/1986 | Baus | 264/284 |
| 4,634,484 | 1/1987 | Wagner | 264/224 |

FOREIGN PATENT DOCUMENTS 53-108159 9/1978 Japan .................. 264/227

Primary Examiner—Jay H. Woo
Assistant Examiner—Robert B. Davis

[57] ABSTRACT

An embossing roll is formed by a process which includes molding a seamless embossing roll within a seamless sleeve. The sleeve has indicia disposed about the inner circumference and which is then reverse molded into the roll.

11 Claims, 2 Drawing Sheets

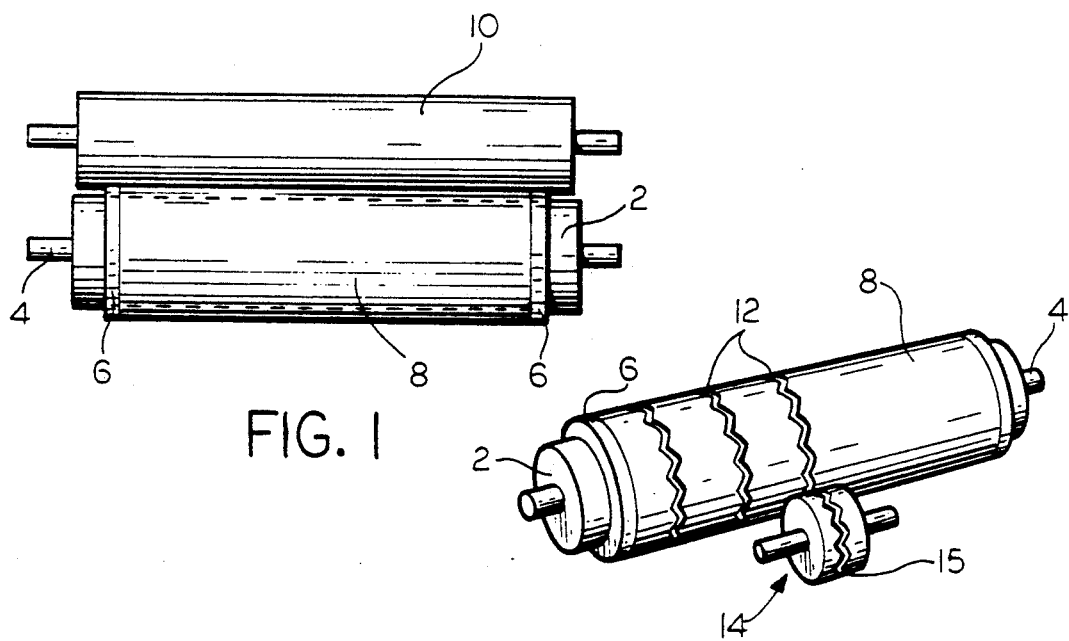
FIG. 1
FIG. 2
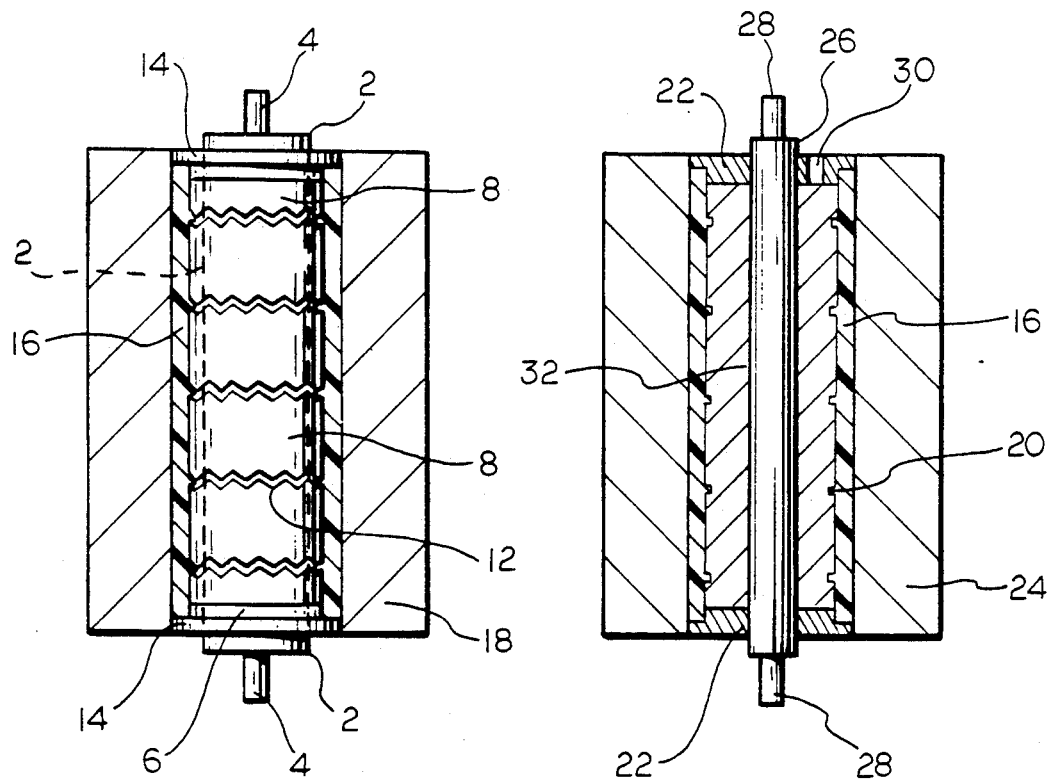
FIG. 3
FIG. 4

METHOD OF MAKING EMBOSSING ROLLS HAVING INDICIA

TECHNICAL FIELD

This invention relates to the art of embossing and more particularly it relates to the formation of embossing rolls. Even more specifically, the present invention relates to a method for forming a seamless embossing roll.

BACKGROUND OF THE ART

Numerous films are provided with decorative indicia by an embossing process in which the film is passed between a pressure roll and an embossing roll to receive such decorative indicia. These films may be formed of numerous polymeric materials including, for example, polyolefins, linear polyesters, polyamides and, for example, poly(vinyl chloride). Additionally these films may optionally be provided with a suitable backing such as, for example, a reinforcing mesh backing of either glass fibers or polymeric fibers such as poly(ethylene terephthlate). The backing may be of the woven or the non-woven type. The methods of manufacturing such films are well known in the art. One specific field where such embossed films are produced is in the manufacture of wallcoverings.

There is a need in the art to provide a process for manufacturing embossing rolls in a more economical manner. There is also a need in the art for manufacturing rolls which are capable of providing embossed, more aesthetically pleasing ornamentation on films without the occurrence of seams. Additionally, in providing a process for manufacturing embossing rolls, there is a need to inject the skilled artist into the manufacturing process to provide the decorative indicia for the rolls, and thereby, provide the opportunity for the innovative creation of a wide variety of ornamental patterns and designs.

Presently, one technique for manufacturing embossing rolls is an electroforming process in which a segmented sleeve is formed. This segmented sleeve provides for the occurrence of seams which is aesthetically undesirable. This is also an expensive and time consuming process and it removes the artist from the process of forming the embossing cylinder.

U.S. Pat. No. 4,634,484 is directed to embossing rollers and forms a sleeve which is positioned around a core and used as the embossing medium. This sleeve is made by a time consuming multi-step process which is costly. In accordance with this process, a design on a roller is coated with a silicone rubber to form an annular member having indicia disposed internally. This sleeve is then turned inside-out and used as an embossing medium to emboss the external surface of a tube of thermoplastic film. The tube of embossed thermoplastic film is then in turn coated with a silicone rubber to form another annular or cylindrical sleeve member which is then vulcanized and turned inside-out. After being turned inside-out the sleeve is drawn over a core roller, after the core roller has been coated with an adhesion promoter and a silicone adhesive, the adhesive coating is then hardened and the composite roller is used as an embossing roller in a device for the continuous embossing of a thermoplastic rectilinear film. Obviously, this is a labor and capital intensive process. Moreover, since the embossing roll is a composite, as opposed to a unitary roll in which the embossing indicia is integral and unitary with the external surface of roll, there is a danger of slippage of the sleeve along the underlying surface which can seriously adversely impact production quality and efficiency.

No molding of the decorating cylinder is suggested by U.S. Pat. No. 4634484.

U.S. Pat. No. 4,551,297 also discloses the formation of a composite embossing or decorating cylinder which includes a silicone sleeve member bearing indicia to be embossed onto a film and wherein the sleeve is adhered to the surface of a cylindrical core. This patent does not describe the formation, by molding, of an embossing cylinder within a sleeve.

Both of the above specific patents are essentially directed at duplicating a leather grain and are not concerned with providing a method wherein the artists may exercise their innovative talents of creating original patterns on a seamless cylinder for use in the continuous embossing of films.

The present invention satisfies the above needs in the art by providing for a process in which seamless embossing rolls are formed in a highly economical manner and in a short period of time. The embossing rolls formed by this invention are unitary; that is, the embossing indicia is integral with the surface of the rolls and is not on a separate sleeve member requiring an additional process step of adhesively adhering the sleeve member to a supporting surface. Furthermore, the present process integrates the artist into the embossing roll production process. The artist can now provide a variety of artistic and original decorative indicia into the rolls which, in turn, will be embossed on the film.

DISCLOSURE OF THE INVENTION

The above needs are satisfied by providing a method for forming a decorating cylinder, i.e. an embossing roll, having indicia desired to be embossed onto a film, the method, or process, comprises molding a seamless curable cylinder within a seamless sleeve, said sleeve having said indicia in reverse from about the inner circumference thereof and said cylinder thereby being provided with said indicia on its outer circumference. The molded cylinder is then cured and used as the improved seamless decorating cylinder to emboss films.

When reference is made herein to indicia and reversed indicia, it will, of course, be apparent that indicia can either be positive or impastoed indicia, i.e. raised surfaces in the nature of a letter press or the indicia can be characterized by recessed surfaces in the nature of a gravure type printing surface. Reversal simply means reversing the indicia from positive, that is raised, to negative, that is recessed, or vice-versa. Thus, any specific pattern, or indicia, can be viewed to be the result of either providing recessed surfaces or impastoed surfaces to define such pattern.

In accordance with another feature of this invention there is provided a method for producing a seamless embossing roll comprising: forming a pattern on the external surface of a modelable, hardenable seamless sleeve member; hardening said sleeve member; turning said sleeve inside-out; dispensing a moldable, hardenable material into the inner portion of said turned inside-out sleeve and allowing said material to mold against the internal surface of said turned inside-out sleeve and hardening said material to form a seamless cylindrical member having a reversal of said pattern on the external surface of said member.

In accordance with yet another feature of this invention, a method is provided for forming a decorating cylinder having indicia thereon which is desired to be embossed onto a film, the method comprising: (i) providing a smooth cylindrical member comprised of a seamless sleeve having an outer exposed surface of an imprintable material; (ii) modeling, or forming, first indicia into said outer surface of said imprintable material; (iii) forming a continuous seamless sleeve about said cylindrical member, said sleeve thereby having molded on its internal surface first indicia in reversed form (iv) molding a curable cylinder within and against the inner surface of said sleeve, said cylinder having indicia desired to be embossed onto a film which substantially corresponds to the first indicia. Thereafter the molded curable cylinder is cured and the resulting decorating cylinder is used in a conventional manner to emboss indicia onto a polymeric film. According to a further aspect, the method comprises embossing a film with the formed decorating cylinder to thereby produce a master of the indicia and thereafter using said master to model indicia into the outer surface of another smooth cylindrical member comprised of a seamless sleeve having an outer embossed surface of an imprintable material.

In accordance with a highly preferred embodiment of this invention, the above need in the art is satisfied by a method for forming a decorating cylinder having indicia which is to be embossed onto a film, the method comprising: imprinting at least a portion of the external circumference of a seamless cylindrical sleeve member to provide a recessed pattern; turning said cylindrical sleeve member inside-out so as to have said recessed pattern disposed on the internal portion of said sleeve; molding an embossing cylinder having said recessed pattern in reversed form within said sleeve, said molding being done by dispensing a molding resin inside the turned sleeve.

BRIEF DESCRIPTION OF THE DRAWINGS

Referring to the drawings:

FIG. 1 schematically illustrates one step in the process of the present invention;

FIG. 2 schematically illustrates another step in which indicia are modelled into a cylinder;

FIG. 3 represents another step in the process showing the formation of a sleeve;

FIG. 4 represents another step in the process showing the molding of an embossing roll within the formed sleeve;

DETAILED DESCRIPTION OF THE INVENTION INCLUDING THE BEST MODE OF CARRYING IT OUT

Figure 5:
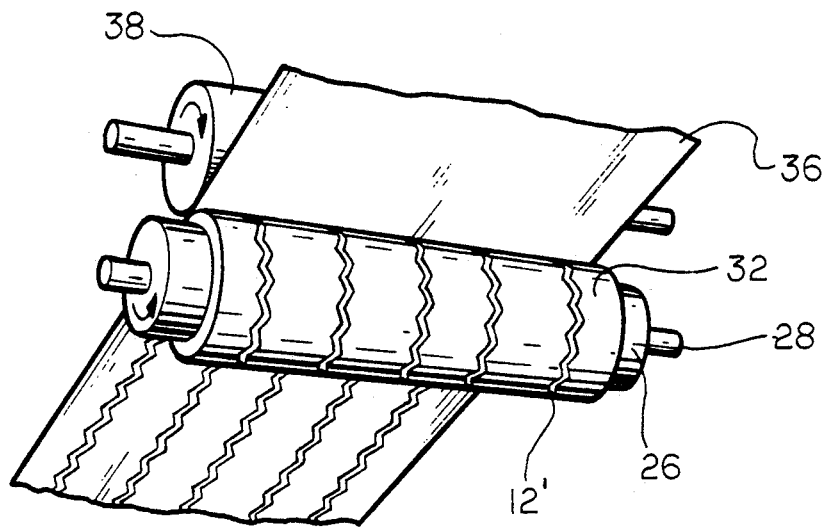
FIG. 5 schematically illustrates the use of an embossing roll in accordance with this invention.

The drawings illustrate various steps in the present method for forming decorating cylinders, or embossing rolls, having indicia which are to be embossed onto a film. Any of a wide variety of films may be so embossed, especially polymeric films like poly(vinyl chloride) and the polyolefins. Importantly, the method comprises molding a seamless decorating cylinder within a seamless sleeve which sleeve carries a design along the internal circumference thereof, and hence the reverse form of the design is molded into the external surface of the decorating cylinder. This decorating cylinder is then used in a conventional manner as the embossing medium or roll.

Referring now to FIGS. 1–4, a metal core cylinder 2 carrying a central shaft 4 and opposed flanges 6 is first provided with a sleeve 8 of a hardenable and imprintable material. This imprintable material is in the nature of what is commonly referred to as modelling clay but more accurately is a plastic molding compound. The plastic molding material is formed into a sleeve, or seamless cylinder, 8 within the flanges 6 around core 2 and, by means of a leveling roller 10, is smoothed into a uniform surface. An especially preferred imprintable material for this purpose is a plasticized poly(vinyl chloride). One such material is the material available from Polyform Products Company as their Super Sculpey product line.

The next step in the process, as seen in FIG. 2, is to form or, model indicia in the outer surface of the imprintable cylindrical member 8. In FIG. 2, indicia, or pattern, 12 is schematically shown to be formed into the imprintable sleeve 8 using a device 14 which is in the form of a roller carrying raised indicia 15. Depending on the nature of the pattern to be formed in the sleeve 8 of modelling material, the indicia 12 may either be recessed or it may be raised, or impastoed. Preferably, the plastic modelling material with the pattern formed in its circumferential externally disposed surface is then heat-hardened. These modelling compounds are preferably of a plasticized poly(vinyl chloride) and have heat-hardening cycles of about 250° to 325° F. for about 5 to about 15 minutes.

After the heat-hardening of the hardenable plastic modelling material, a continuous elastic seamless sleeve 16 is formed about the cylindrical sleeve 8 in such a manner that the newly formed sleeve is provided on its internal surface with a reversed form of the indicia 12, initially formed as set forth in FIG. 2. These steps are generally best appreciated by reference to FIG. 3. Opposed flanges 14 are applied over core 2 outwardly of flanges 6. They have diameters larger than the diameter of the hardened modelling compound of sleeve 8. Within the confines of flanges 14 and around the cylindrical surface of the hardened sleeve 8, an annular or sleeve member 16 is then formed generally in the same manner as was seamless cylinder 8.

Seamless sleeve 16 is of a moldable material which likewise can be hardened such as, for example, by heat. This material is resilient and flexible after heating. Silicone rubbers generally are most suitable for this purpose. One such material is Thixotropic POR-A-MOLD prepolymer and S-333TA curative commercially available from the Synair Corp. The materials are used in a ratio of 1:1 (by volume). The mixture hardens and curls at room temperature in 12 to 24 hours.

In order to maintain rigidity and stability for molding and during heating of sleeve 16, an outer circumscribing and reinforcing mold 18 such as, for example, plaster of Paris is formed around seamless cylinder sleeve 8. Because of the moldable nature of the material of seamless sleeve 16, the internal surface molds and conforms to the indicia 12. Thus, the indicia formed on the internal surface of sleeve 16 is the reverse form of the indicia in the hardened modelling material of sleeve 8. In FIG. 4, this reversed indicia is shown as inwardly extending protuberances 20.

After solidifying and hardening the material of sleeve 16, for example by curing at room temperature the elastic sleeve 16 is separated from the assembly illustrated in FIG. 3. It is then used to mold the decorating cylinder as generally illustrated in FIG. 4.

Referring now to FIG. 4, it will be seen that seamless sleeve 16 is sealingly supported on opposed step flanges 22 and, again for rigidity and support, disposed about sleeve 16 is a reinforcing and supporting mold structure 24, formed of plaster of Paris. Core rod 26 extends between and through step flanges 22 and includes outer rods 28 which can be used to secure the final embossing roll in a conventional embossing mechanism. Upper step flange 22 has an opening 30 through which the moldable and hardenable material used to form decorating cylinder or embossing roll 32 is added inside sleeve 16. Especially suitable materials for the final embossing roll 32 are cured polyurethanes and cured epoxies with an especially preferred formulation being EPON 828 epoxy 100 parts manufactured by Shell along with an amine curative (100 parts) sold under the designation Ancamide 260A by Pacific Anchor Chemical Corporation. After the material used to form decoration cylinder 32 is added within the internal confines of sleeve 16 and sufficient time is allowed for the material to mold against the internal surface of sleeve 16, the material is cured. This can be done by heating, for example, at a temperature of 140° F. for two hours and then at 212° F. for one hour. The curing also binds the material to core rod 26. External supporting structure 24 and flexible sleeve 16 are then separated from the cured embossing cylinder 32.

FIG. 5 generally shows the use of embossing roll 32 to provide the embossing indicia 12' onto a polymeric film 36. The embossing is done by passing film 36 through the nip provided by embossing roll 32 and a compression roll 38.

FIG. 5 also schematically illustrates another embodiment of the invention wherein at least a portion of the film 36 is later employed as a master. In this embodiment, film 36 with indicia 12' is used later to provide the indicia 12 onto the imprintable material of sleeve 8 as set forth in FIG. 2. In other words, the material 36 with the indicia 12' is used as a substitute for the device 14 schematically illustrated in FIG. 2.

As will be apparent from the foregoing, one of the advantages of the present invention is that in providing the indicia 12 into the moldable material, as set forth in FIG. 2, an artist is now free to create any ornamental and original pattern as such artist desires. This can be done by the use of a any positive device, or jig, to form recessed indicia of the desired pattern in the surface of sleeve 8.

Figure 6:
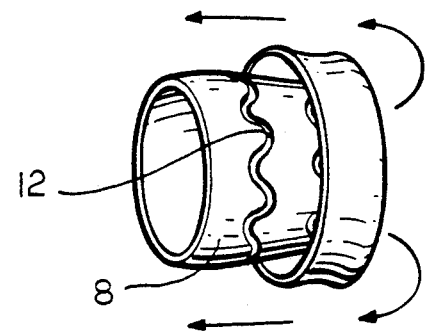
FIG. 6 illustrates a step in an alternate and preferred embodiment of this invention.
Figure 7:
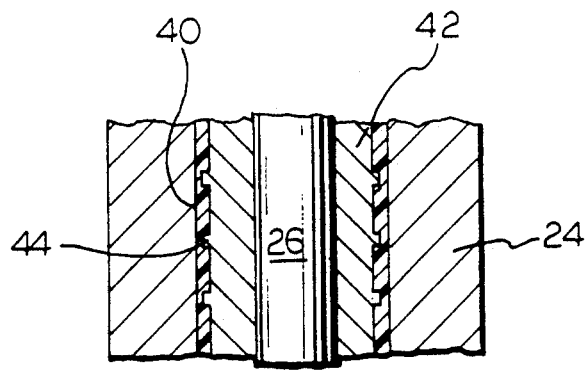
FIG. 7 represents a further step in a preferred embodiment of this invention.
Figure 8:
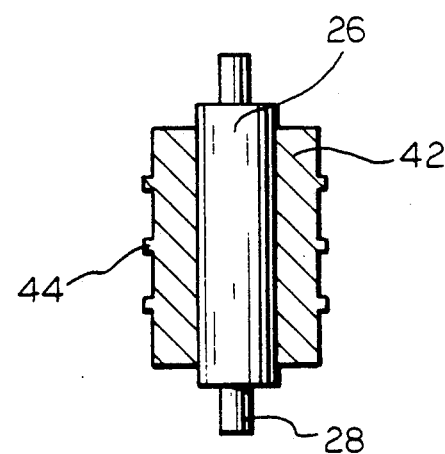
FIG. 8 shows a decorating cylinder produced in accordance with this invention.

FIGS. 6–8 along with FIGS. 2 & 4 generally schematically illustrate an alternate, and preferred, embodiment of this invention. In accordance with this embodiment, the molding step generally set forth in FIG. 3 is eliminated.

In this embodiment, a pattern is first formed on the external portion of the moldable, hardenable, seamless sleeve member as set forth in FIG. 2. The sleeve is then hardened as previously described but the material used in this embodiment needs to be more flexible and resilient than the material which can be used in the previous embodiment. After hardening, the sleeve is then turned inside-out and the inside-out sleeve is then used as a mold member into which a moldable, hardenable material which is to be used to form the embossing roll is dispensed and allowed to flow and mold against the inner portion of the sleeve. This molded material is then hardened to produce the embossing roll, namely a seamless cylindrical member having a pattern which is the reverse of the pattern initially formed in the external portion of the moldable, hardenable seamless sleeve member before its hardening and being turned inside-out.

More specifically, in this embodiment, the moldable material is formed as a smooth, seamless sleeve 8 about core 2 in the manner described above with regard to FIGS. 1 & 2. Here, however, as indicated a material is needed which is flexible and resilient after hardening. One preferred material for this embodiment of the invention is a plastic molding material sold under the designation Super Elasticlay by the Polyform Products Co. The next step is to form a pattern in sleeve 8 as by imprinting indicia 12 into at least a portion of the external circumference of the seamless cylindrical sleeve member 8 to provide indicia, in this example, in the form of a recessed pattern. The indicia-bearing, moldable material in the form of the endless, seamless sleeve 8 is then hardened by heating at about 300° F. for 15 to 30 minutes. As seen in FIG. 6, sleeve 8 of the now hardened resilient material bearing recessed indicia 12 is turned inside-out so that the indicia 12 is now disposed on the internal portion of the sleeve. The turned inside-out sleeve is designated 40 in FIG. 7.

The final embossing roll is formed in the manner explained above with regard to FIG. 4 and as generally illustrated in FIG. 7. The curable moldable epoxy resin is placed within sleeve 40 outwardly of a core cylinder 26 and extending rods 28. As in the case with the previous embodiment, an outer supporting mold 24 is also provided. The epoxy is allowed to flow into the recesses of indicia 12 to form outwardly extending protuberances 44 on the embossing roll 42. Thereafter the roll is cured as above and the roll used in the manner of FIG. 5 to emboss film 36.

Thus, having described the present invention, it of course will be apparent that modifications are possible which pursuant to the patent statutes and laws, including application of the doctrine of equivalents, do not depart from the spirit and scope of this invention.

I claim:

1. A process for forming a decorating cylinder having indicia thereon which is desired to be embossed onto a film, said method comprising:
   (i) providing a seamless cylindrical member;
   (ii) providing a seamless, outer exposed surface of an imprintable material over said cylindrical member;
   (iii) modeling first indicia into said outer surface of said imprintable material;
   (iv) forming a continuous seamless sleeve about said cylindrical member, said sleeve having reversed indicia in its internal surface resulting from the molding of the sleeve against the outer surface of said cylinder;
   (v) molding a decorating cylinder within and against the inner surface of said sleeve, said cylinder having indicia substantially corresponding to said first indicia.

2. The process of claim 1 wherein said modeling comprises contacting said outer surface of said seamless cylindrical member with an object so as to form recessed indicia in said surface and wherein said reversed indicia of said sleeve comprises impastoed indicia.

3. The process of claim 1 wherein said sleeve in step (iii) is formed of a hardenable material and further comprising hardening said sleeve prior to said molding.

4. The process of claim 1 further comprising (vi) embossing said indicia onto a polymeric film by contacting said film with said indicia of said decorating cylinder.

5. The process of claim 1 wherein said molding comprises providing a moldable, liquified form of a curable organic resin within said sleeve and in contact with said reversed indicia, curing said resin and removing said sleeve.

6. A process for forming a decorating cylinder having indicia which is to be embossed onto a film comprising:
   (i) imprinting at least a portion of the external circumference of a seamless cylindrical sleeve member to provide a recessed pattern;
   (ii) turning said sleeve inside-out so as to have said recessed pattern disposed on the internal portion of said sleeve;
   (iii) molding a decorating cylinder within said turned sleeve, said cylinder containing said recessed pattern in reversed form.

7. The method of claim 6 and further comprising the step of (iv) embossing a film by contact with said decorating cylinder.

8. The method of claim 6 and further comprising heating said sleeve having said imprinted pattern to harden same prior to turning it inside-out.

9. A method for producing a seamless embossing roll comprising: forming a pattern on the external surface of a modelable, hardenable, seamless sleeve member, hardening said sleeve member; turning said sleeve inside-out; dispensing a moldable, hardenable material into the inner portion of said turned inside-out sleeve and allowing said material to mold against the internal surface of said turned inside-out sleeve; and hardening said material so as to form a seamless cylindrical member having a reversal of said pattern on the external surface of said member.

10. A process for forming a decorating cylinder having indicia thereon which is desired o be embossed onto a film, said method comprising:
   (i) providing a seamless cylindrical member having a seamless, outer exposed surface of a heat hardenable material;
   (ii) modeling first indicia into said outer surface of said imprintable material;
   (iii) heating said material to harden same;
   (iv) forming a continuous seamless sleeve about said cylindrical member, said sleeve having reversed indicia in its internal surface resulting from the molding of the sleeve against the outer surface of said cylinder;
   (v) molding a decorating cylinder within and against the inner surface of said sleeve, said cylinder having indicia substantially corresponding to said first indicia.

11. The process of claim 10 and further comprising embossing a film with indicia by contacting said film with said hardened material of said cylindrical member to thereby produce a master film and performing the modeling of step (ii) by using said master as a modeling tool.

* * * * *